(12) United States Patent
Zaus et al.

(10) Patent No.: US 10,021,628 B2
(45) Date of Patent: *Jul. 10, 2018

(54) PREVENTING A MOBILE DEVICE FROM REPEATING A REQUEST TOWARD A MOBILE NETWORK

(71) Applicant: Intel IP Corporation, Santa Clara, CA (US)

(72) Inventors: Robert Zaus, Munich (DE); Chen-Ho Chin, Deerlijk (BE)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,472

(22) Filed: Nov. 17, 2017

(65) Prior Publication Data

US 2018/0092570 A1 Apr. 5, 2018

Related U.S. Application Data

(63) Continuation of application No. 15/112,116, filed as application No. PCT/US2015/038064 on Jun. 26, 2015, now Pat. No. 9,900,828.

(Continued)

(51) Int. Cl.
*H04W 4/00* (2018.01)
*H04W 48/14* (2009.01)
(Continued)

(52) U.S. Cl.
CPC ........... *H04W 48/14* (2013.01); *H04W 36/08* (2013.01); *H04W 36/14* (2013.01); *H04W 48/18* (2013.01);
(Continued)

(58) Field of Classification Search
CPC ....... H04W 8/18; H04W 48/04; H04W 48/08; H04W 76/06; H04W 12/06; H04W 48/14;
(Continued)

(56) References Cited

U.S. PATENT DOCUMENTS

2005/0288016 A1* 12/2005 Kuchibhotla ......... H04W 48/04
455/435.2
2008/0207170 A1* 8/2008 Khetawat ............ H04W 60/005
455/411

(Continued)

FOREIGN PATENT DOCUMENTS

WO 20050048631 A1 5/2005
WO WO 2005048631 A1 * 5/2005 ............ H04W 48/18

(Continued)

OTHER PUBLICATIONS

Supplementary European Search Report for EP Application No. 15814016.0, 14 pages, dated Dec. 1, 2017.

(Continued)

*Primary Examiner* — Mahendra Patel
(74) *Attorney, Agent, or Firm* — Spectrum IP Law Group LLC

(57) ABSTRACT

Briefly, in accordance with one or more embodiments, a network node of a first Public Land Mobile Network (PLMN) receives a request from a user equipment (UE) for a service to be provided to the UE by the first PLMN, and sends a response to the UE indicating whether the request is accepted or rejected, wherein the response indicates to the UE whether the UE is allowed to repeat the request if the UE connects to a second PLMN that is an equivalent PLMN with the first PLMN.

28 Claims, 7 Drawing Sheets

Related U.S. Application Data

(60) Provisional application No. 62/019,295, filed on Jun. 30, 2014, provisional application No. 62/027,112, filed on Jul. 21, 2014, provisional application No. 62/036,957, filed on Aug. 13, 2014.

(51) Int. Cl.
*H04W 48/20* (2009.01)
*H04W 36/14* (2009.01)
*H04W 48/18* (2009.01)
*H04W 60/00* (2009.01)
*H04W 36/08* (2009.01)
*H04W 84/04* (2009.01)

(52) U.S. Cl.
CPC ......... *H04W 48/20* (2013.01); *H04W 60/005* (2013.01); *H04W 84/042* (2013.01)

(58) Field of Classification Search
CPC ..... H04W 36/08; H04W 36/14; H04W 48/18; H04W 48/20; H04W 60/005; H04W 84/042; H04Q 7/20; H04Q 7/38
USPC ................. 455/435.1, 435.2, 436, 423, 411; 370/337, 328, 338
See application file for complete search history.

(56) References Cited

U.S. PATENT DOCUMENTS

| | | | | |
|---|---|---|---|---|
| 2009/0005033 A1* | 1/2009 | Wijayanathan | ....... | H04W 76/25 455/426.1 |
| 2010/0041370 A1* | 2/2010 | Narasimha | ......... | H04W 74/008 455/410 |
| 2010/0265893 A1* | 10/2010 | Dwyer | .................... | H04W 8/06 370/329 |
| 2010/0265926 A1* | 10/2010 | Dwyer | ................. | H04W 48/18 370/338 |
| 2010/0267384 A1* | 10/2010 | Dwyer | ................. | H04W 48/18 455/435.2 |
| 2012/0076121 A1* | 3/2012 | Choi | ..................... | H04W 36/08 370/338 |
| 2012/0077456 A1* | 3/2012 | Tiwari | ................. | H04W 48/16 455/404.1 |
| 2012/0088495 A1* | 4/2012 | Tsai | ...................... | H04W 76/18 455/422.1 |
| 2012/0178449 A1* | 7/2012 | Liao | ...................... | H04W 60/00 455/435.2 |
| 2013/0077515 A1* | 3/2013 | Jung | ..................... | H04W 48/20 370/252 |
| 2013/0143615 A1* | 6/2013 | Juang | ................ | H04W 52/0222 455/522 |
| 2013/0208644 A1* | 8/2013 | Jung | ....................... | H04W 4/08 370/312 |
| 2013/0308527 A1* | 11/2013 | Chin | ................. | H04W 36/0022 370/328 |
| 2014/0004850 A1* | 1/2014 | Kwon | ................... | H04W 68/02 455/423 |
| 2014/0153408 A1* | 6/2014 | Jun | ..................... | H04L 65/1066 370/250 |

FOREIGN PATENT DOCUMENTS

| | | | | |
|---|---|---|---|---|
| WO | 20070083212 A1 | 7/2007 | | |
| WO | WO 2007083212 A1 * | 7/2007 | ............ | H04W 60/00 |
| WO | 20120050841 A1 | 4/2012 | | |
| WO | WO 2012050841 A1 * | 4/2012 | ........ | H04W 36/0022 |

OTHER PUBLICATIONS

"Session Management Procedures", 3GPP Draft; Mobile Competence Centre; 650, Jun. 2014, 571 pages.

Notification of Publication for HK Application No. 17106869.6, Publication No. 1233416A, 2 pages, dated Jan. 8, 2018.

Office Action received for Japanese Patent Application No. 2017-518054, dated Feb. 6, 2018, 8 pages including 4 pages of English translation.

Alcatel-Lucent, et al., "MS Retry Handling With Optional Network Signalled Timer," Specification, May 19-23, 2014, 18 pages, version 12.5.0, 3GPP TSG-CT WG1 Meeting #87, Phoenix, AZ.

3GPP, "Mobil Radio Interface Layer 3 Specification," Specification, Jun. 2014, 16 pages, V12.6.0, 3GPP TS 24.008.

3GPP, "Non-Access-Stratum (NAS) protocol for Evolved Packet System," Specification, Jun. 2014, 19 pages, V12.5.0, 3GPP TS 24.301.

Intel Corporation, "PLMN Indicator for Control of Mobile SM and ESM Retries in Plmn Change," Meeting, Nov. 17-21, 2014, 6 pages, C1-144633, 3GPP TSG CT WG1 Meeting #89, San Francisco, CA.

* cited by examiner ized out and rolling delay flag feature before that feature or service. PLMNs otherwise may be able before other PLMNs are able to provide that

PREVENTING A MOBILE DEVICE FROM REPEATING A REQUEST TOWARD A MOBILE NETWORK

CROSS-REFERENCE TO RELATED APPLICATIONS

The present application is a continuation application of U.S. application Ser. No. 15/112,116, pending, filed Jul. 15, 2016 (pending), which is a national stage application under 35 U.S.C. § 371 of International Application No. PCT/US2015/038064 filed on Jun. 26, 2015. Said Application No. PCT/US2015/038064 claims the benefit of U.S. Provisional Application No. 62/019,295 filed Jun. 30, 2014, the benefit of U.S. Provisional Application No. 62/027,112 filed Jul. 21, 2014, and the benefit of 62/036,957 filed Aug. 13, 2014. Said application Ser. No. 15/112,116, said Application No. PCT/US2015/038064, said Application No. 62/019,295, said Application No. 62/027,112, and said Application No. 62/036,957 are hereby incorporated herein by reference in their entireties.

BACKGROUND

A mobile device such as a user equipment (UE) may switch among one or more networks such as a Public Land Mobile Network (PLMN) available in a given geographical location, or may switch to a new network when moving from one geographical location to another. When the UE registers with the new network, the UE may send a request to the network to utilize a service that the UE desires to utilize. Generally, it can occur that the network may reject one or more such requests from the UE, and there is a requirement that UE shall not send the same request until the UE registers with another PLMN or one of a number of other events occurs. The other event may include, but is not limited to, a switch-off/switch-on of the UE, removal of a Universal Subscriber Identity Module (SIM/USIM), or expiry of a timer which is started when the reject message is received by the UE. In some cases, however, for example for some network configurations, it makes sense to allow the UE to send the same request only after it registered with another PLMN which is not in the list of equivalent PLMNs, whereas in other cases the UE should be allowed to send the same request after registration with any other PLMN, regardless whether it is equivalent to the network sending the reject message or not. Current Non-Access Stratum (NAS) protocols do not provide the network with the flexibility to indicate whether or not the UE is allowed to apply the above conditional re-requests. In general, all network configurations have to live with that same UE behavior even though a UE behavior different from the one presently specified may be appropriate. Further UE access attempts and request repeats may result in unnecessary additional signaling if a given feature or service is not supported anywhere in the equivalent PLMNs. On the other hand, the UE may not reattempt a request for the feature or service after a registration with an equivalent PLMN, even though the new PLMN would be able to support the feature or service because the new PLMN may be configured differently from the previous PLMN. Currently, it is not possible to handle service re-requests from the UE in a flexible way for various reject cases. Typically only one behavior or rule is specified as the only possible UE implementation, and all network operators have to live with that UE behavior. In certain cases, the specification for a given UE behavior may force network operators to coordinate the deployment of services or features among all the equivalent PLMNs which may result in a delay of rolling out of a feature or service that some PLMNs otherwise may be able to provide before other PLMNs are able to provide that feature or service.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
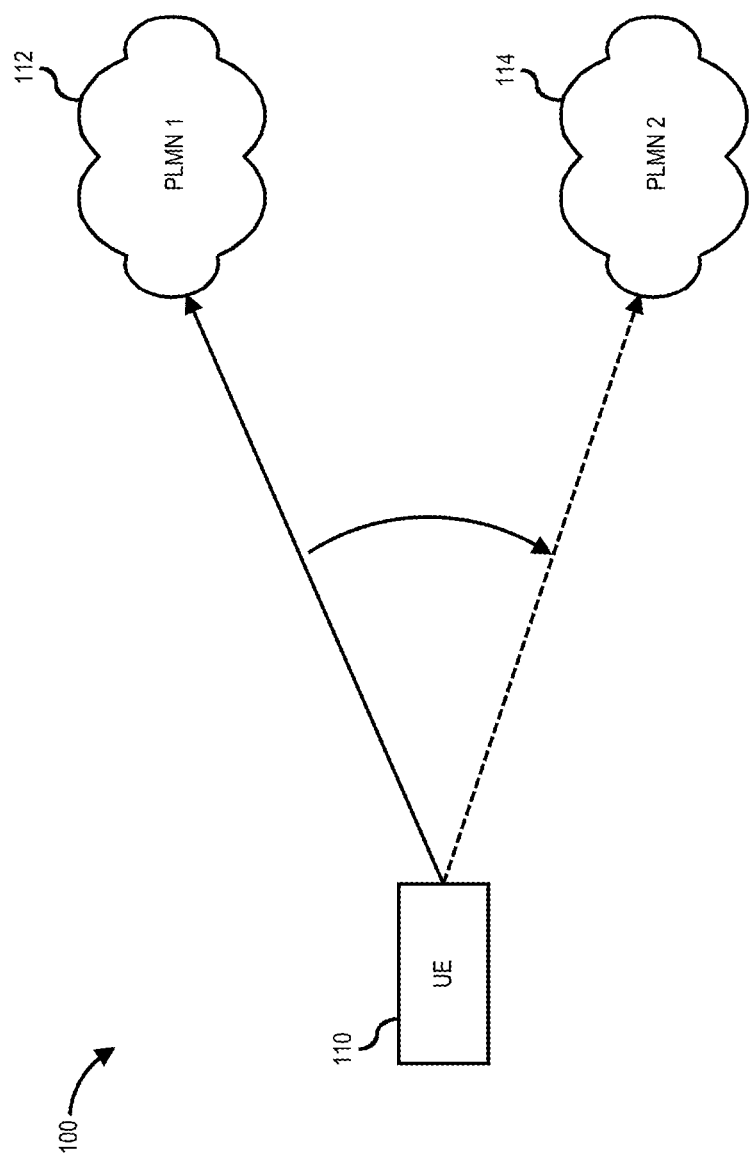
FIG. 1 is a diagram of a network system in which a user equipment may change its connection from a first Public Land Mobile Network (PLMN) to a second Public Land Mobile Network (PLMN) in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a network system in which a user equipment may change its connection from a first Public Land Mobile Network (PLMN) to a second Public Land Mobile Network (PLMN) in accordance with one or more embodiments will be discussed. As shown in FIG. 1, a network system 100 may comprise a user equipment (UE) 110 in communication with and receiving services from a first network 112 comprising a first Public Land Mobile Network (PLMN1). At some point, UE 110 may need to switch to receiving communication services with a second network 114 comprising a second Public Land Mobile Network (PLMN2). When UE 110 switches from first network 112 to second network 114, UE 110 may send a request to second network 114 certain types of services. For example, UE 110 may request network 114 to utilize a circuit switched (CS) call back procedure in which UE 110 may utilized CS based voice services in addition to packet switched (PS) services in addition to Long Term Evolution (LTE) access. If the new network 114 cannot provide the requested services to UE 110, UE 110 is not allowed to continue to repeat such a request to network 114.

The embodiments discussed herein are directed to preventing UE 110 from repeating a request toward a mobile network such as network 114, and to indicate to UE 110 when such requests may be repeated if certain conditions are met. In one or more embodiments, signaling between network 112 and UE 110 may be enhanced so that network 112 explicitly indicates to UE 110 whether it is allowed to re-request a certain feature or service when certain conditions apply when switching to a new network such as network 114. As a result, when network 112 rejects a request from UE 110 for a certain feature or service, network 112 indicates to UE 110 whether the reason for the rejection holds or does not hold for equivalent PLMNs known to UE 110 such as network 114. It should be noted that in one or more embodiments a discussed herein, one or more PLMNs may be referred to as equivalent to a first PLMN wherein an equivalent PLMN is equivalent to the first PLMN for purposes of at least one of PLMN selection, cell selection, cell re-selection, or handover, or a combination thereof. Furthermore, one or more PLMNs may be referred to as equivalent to a first PLMN if a feature or service supported by the first PLMN is also supported by the one or more other PLMNs, or if a feature of service not supported by the first PLMN is also not supported by the one or more other PLMNs. In one or more embodiments, network system 100, network 112, and/or network 114 may operate in compliance with a Third Generation Partnership Project (3GPP) standard, and the concept of an equivalent PLMN may refer to an equivalent PLMN as defined in a 3GPP standard. Thus, in one or more embodiments, one of skill in the art may turn to a 3GPP standard for an understanding of how a second PLMN may be equivalent to a first PLMN. It should be noted, however, that these are merely examples of how one or more PLMNs may be referred to as equivalent with a first PLMN, and the scope of the claimed subject matter is not limited in these respects.

In one or more embodiments, network 114 may be considered an equivalent PLMN with network 112 regarding the support or non-support of certain features and services. For example, regarding consideration of an equivalent PLMN, it may be possible to handle cases where one network operator accepts access from access networks with different network identifiers (IDs). It also may be possible to indicate to UE 110 that a group of PLMNs are equivalent to the registered PLMN regarding PLMN selection, cell selection and re-selection, and handover. Network 112 may signal to UE 110 during a location update, attach, routing area update, or tracking area update procedure that UE 110 shall treat certain PLMNs as equivalent PLMNs. In order to indicate this information, network 112 may provide an information element (IE) with a list of the PLMN identities of the equivalent PLMNs in a Location Update Accept, Attach Accept, Routing Area Update Accept, or Tracking Area Update Accept message. For example, the access network 112 of a mobile services operator may be provided for only certain radio access technologies such as an Evolved Universal Terrestrial Radio Access Network (E-UTRAN) only, or it may be providing only limited geographical coverage such as only in densely populated areas. By indicating that one or more other networks such as network 114 is an equivalent PLMN with network 112, the access network 112 of one operator may be combined with the access network of another operator in the same or an adjacent geographical area so that the combined, equivalent networks are then supporting additional access technologies or are providing coverage in a much larger area.

In one or more embodiments, the concept of an equivalent PLMN may be utilized by different mobile network operators in different ways. For example, operators who do not have a license for Universal Terrestrial Radio Access Network (UTRAN) or Evolved-UTRAN (E-UTRAN) operation from the regulating body may be able to combine their legacy network, for example network 112, with the UTRAN or E-UTRAN network deployed by another operator of network 114, and thus to offer higher data rates also to their own subscribers. In another example, operators may have subsidiaries in neighboring countries. Such operators can use the concept of equivalent PLMNs to ensure that when UE 110 crosses the border between the two countries in which the operator operates UE 110 will switch from network 112 to network 114 to select a PLMN of its subsidiary instead of choosing another PLMN. In yet another example such as at an airport, an operator may send a list of equivalent PLMNs via network 112 to UE 110 to provide UE 110 with a list of preferred roaming partners in one or more destination countries. When the subscriber switches on UE 110 after an international flight to a destination country, one of the PLMNs in the destination country may already be stored on his UE as equivalent PLMN such as network 114. In such a case, UE 110 may give higher preference to a PLMN on its equivalent PLMN list, thereby selecting that PLMN by connecting with network 114.

In some cases, depending on how closely the operators of different access networks are cooperating, it may be possible that an operator is providing its subscribers with the same set of features and services via the different access networks. On the other hand, if a certain feature or service cannot be supported via all the different access networks and UE 110 is frequently changing from one access network 112 to another access network 114, the user experience may be poor, and it may be better to deactivate the support of the respective feature or service in the whole combined network. An example for deactivating support of feature that may not be widely supported is the circuit switched (CS) fallback procedure. If UE 110 is configured to use a CS fallback with network 112 and then registers with an E-UTRAN of a new network 114 acting as a visited PLMN (VPLMN), but network 114 does not support CS fallback, the default behavior of UE 110 may be to attempt to select a Global System for Mobile Communications (GSM) Enhanced Data Rates for GSM Evolution (EDGE) Radio Access Network (GERAN), Universal Terrestrial Radio Access Network (UTRAN), or Single-Carrier Radio Transmission Technology (1xRTT) circuit switched (CS) radio access technology in the VPLMN or in a PLMN equivalent to the VPLMN. In such a case, the default behavior of UE 110 may be to not autonomously attempt to select or reselect the E-UTRAN for the duration of the time that UE 110 stays in connection network 114 as VPLMN or in PLMNs equivalent to the VPLMN In some cases, the default behavior may be changed based on user preference settings.

Such a default behavior of UE 110 may be justified, for example, if a GERAN with PLMN ID1 and a UTRAN and an E-UTRAN with PLMN ID2 are serving the same geographic area, such that the two PLMN IDs are signaled to be equivalent, and the E-UTRAN does not support CS fallback. For such a case, it may be better for the user experience to abstain from further attempts to select the E-UTRAN if UE 110 is frequently changing from GERAN to UTRAN and back, because each time UE 110 attempts to register via the E-UTRAN it will find out that CS fallback is not supported and will select back to GERAN or UTRAN. In other words, the attempted reselections to the E-UTRAN will only result in unnecessary battery drain from the tracking area update signaling, and there will be frequent short time periods during which UE 110 will not be reachable for mobile terminating paging. In another situation, CS fallback may be supported in the subscriber's home PLMN (HPLMN), PLMN1, but not in the equivalent PLMN, PLMN 2, of the subsidiary operator on the other side of the border. For such a case, once UE 110 has detected in PLMN2 that CS fallback is not supported, there may be a risk that UE 110 will not reselect to E-UTRAN even after UE 110 has moved back to its HPLMN, PLMN 1.

A further example is the session management procedure for the activation of a default PDP context and the corresponding establishment of a PDN connection. In such a case, the network can reject the activation request with a session management cause indicating:

50 "PDP type IPv4 only allowed"
51 "PDP type IPv6 only allowed", or
66 "requested APN not supported in current RAT and PLMN combination"

and UE 110 shall not automatically send another ACTIVATE PDP CONTEXT REQUEST message for the same Access Point Name (APN) using the same PDP type if #50 or #51 was received, or for the same APN in A/Gb- or Iu-mode if #66 was received, until a new PLMN which is not in the list of equivalent PLMNs is selected. In this case, depending for example on whether the network is always selecting a GGSN or PDN-GW from the same core network, or whether dependent on the access network a different GGSN or PDN-GW is selected, an activation request initiated in the equivalent PLMN may be successful or not. It should be noted, however, that if the activation in the equivalent PLMN is successful, there is no guarantee that such a PDP context or PDN connection can be maintained after UE 110 has changed back to the first PLMN. Without further information, UE 110 cannot know in advance whether it is worth reattempting the PDP context activation in the equivalent PLMN.

In one or more embodiments as discussed further herein, the basic principle of allowing UE 110 to request a service or feature further may be enhanced by considering other types of mobility events. For example, UE 110 can be allowed or not allowed to send the same request after any inter-RAT change, or after an inter-RAT change between GERAN/UTRAN and E-UTRAN but not after inter-RAT change between GERAN and UTRAN, or after entering a new location area, tracking area or routing area, or after entering a new cell.

In one or more embodiments, network 112 can send a new indication to UE 110 indicating for the feature or service that was requested by UE 110 and accepted or rejected by the network, whether that acceptance or rejection is applicable to all equivalent PLMNs or whether that acceptance or rejection is not applicable to all equivalent PLMNs. As discussed herein, such an indication whether applicability of the acceptance or rejection is applicable to all equivalent PLMNs may be referred to as a scope indicator. The indication of a scope indicator may be signaled by network 112 in the form of a default scope indicator which UE 110 may apply to any feature or service that is subsequently requested by UE 110 and accepted or rejected by network 112, or in the form of a specific scope indicator provided by network 112 in response to a specific request for a feature or service. If network 112 provides both indications, then for a specific feature or service the latter, the specific scope indicator will override the default scope indicator. In the event a default scope indicator is not provided, in one embodiment UE 110 may assume a generic default value for all features or services wherein the generic default value may be specified for the signaling protocol under consideration. In the event a default scope indicator is not provided, in a second embodiment UE 110 may not assume any generic default value applicable to all features or services. In the second embodiment, network 112 can provide a specific value for the scope indicator in response to a specific request for a feature or service. If network 112 does not provide a specific value, then UE 110 may assume a default value for the specific feature or service, wherein the default value may be specified for each feature or service and signaling protocol under consideration.

Prior to or at the same time when sending a request to network 112, for example during a location update, attach, routing area update, or tracking area update procedure, UE 110 may indicate to network 112 whether UE 110 is capable of understanding the scope indicator or default scope indicator, or both, and whether UE 110 is capable of supporting the new behavior of UE 110 involved in reaction to the indication from network 112 of the applicability of features or services in equivalent PLMNs. Such an indication from UE 110 to network 112 may be utilized by network 112 to optimize the sending of the one or more indications of applicability of features or services in equivalent PLMNs. Any of the above embodiments or approaches may be utilized individually or in combination, without necessarily excluding the utilization of other dependent or independent methods described herein. The following examples illustrate the case when network 112 provides an indication when it rejects a request for a certain feature or service for purposes of discussion, but the scope of the claimed subject matter is not limited in this respect.

Figure 2:
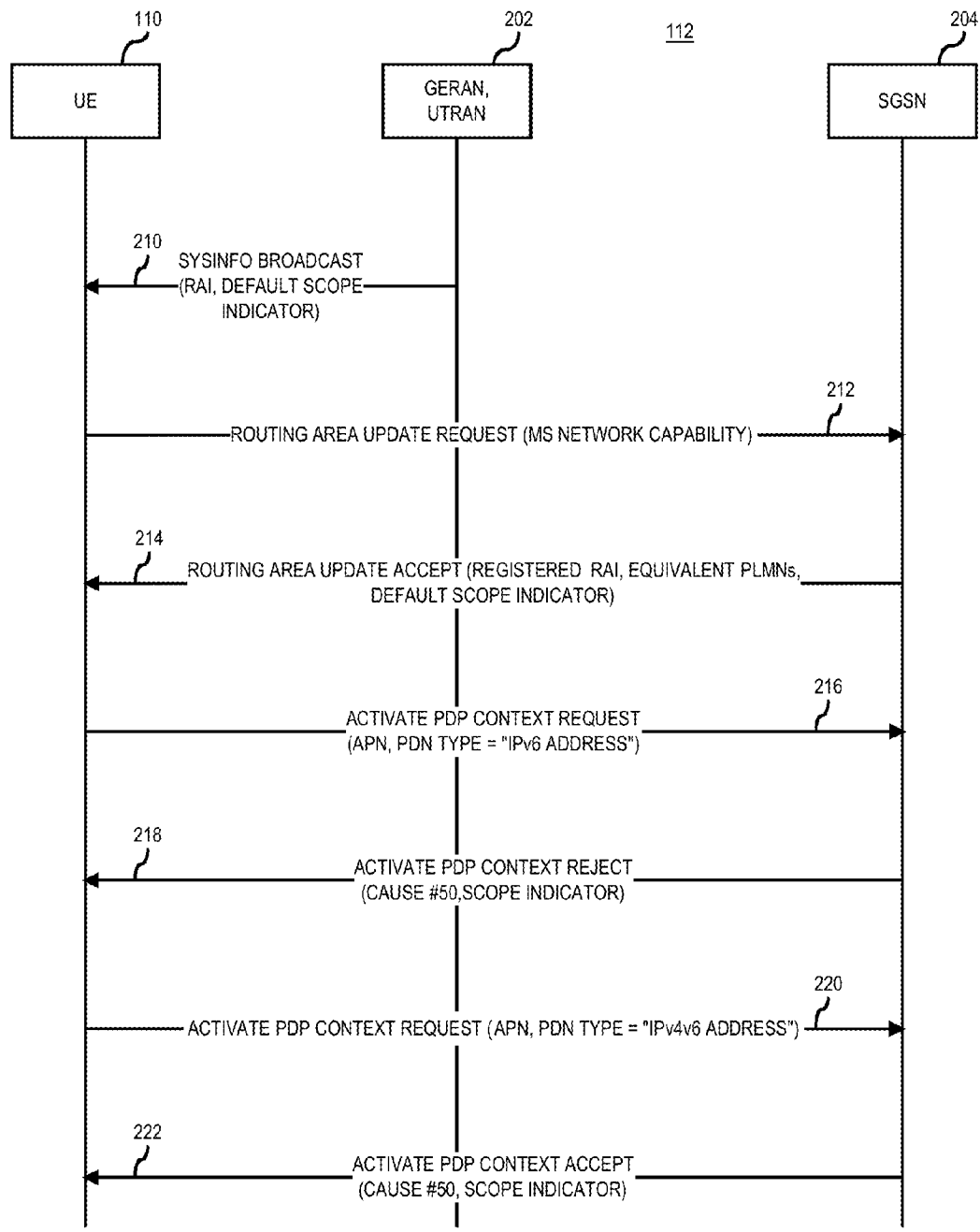
FIG. 2 is a diagram of a message flow in a network between a user equipment and a serving general packet radio service support node (SGSN) via a Global System for Mobile Communications (GSM) Enhanced Data Rates for GSM Evolution (EDGE) Radio Access Network (GERAN) or a Universal Terrestrial Radio Access Network (UTRAN) in accordance with one or more embodiments.

Referring now to FIG. 2, a diagram of a message flow in a network between a user equipment and a serving general packet radio service support node (SGSN) 204 via a Global System for Mobile Communications (GSM) Enhanced Data Rates for GSM Evolution (EDGE) Radio Access Network (GERAN) or a Universal Terrestrial Radio Access Network (UTRAN) (GERAN/UTRAN) 202 in accordance with one or more embodiments will be discussed. It should be noted that similar message flows as shown in FIG. 2 also may be applicable for UE 110 and a Serving General Packet Radio Service (GRPS) Support Node (SGSN) 204 if UE 110 performs an attach procedure instead of a routing area update. The Activate Packet Data Protocol (PDP) context Request session management procedure is one example wherein similar message flows are applicable for other session management procedures such as Secondary PDP context activation or PDP context modification, or for mobility management procedures, for example the service request procedure via UTRAN. Furthermore, similar message flows are applicable between UE and MSC/VLR via GERAN/UTRAN and between UE 110 and a Mobility Management Entity (MME) via E-UTRAN.

The message flow shown in FIG. 2 may occur when UE 110 first connects with a network such as network 112. In procedure 210 UE 110 receives the system information broadcast, and an indication of the routing area identity (RAI) of the cell in which UE 110 is currently located. Optionally, the system information broadcast also may include a default scope indicator. In procedure 212, UE 110 initiates a routing area update procedure because UE 110 has entered a cell or network 112 belonging to a new routing area or to a new network 112, or otherwise when UE 110 first registers with network 112. Optionally, UE 110 may indicate in the Routing Area Update Request message that UE 110 understands the Support indicator Information Element (IE) and supports the corresponding new behavior by indicating that support, for example in a new parameter in the mobile station (MS) network capability IE or any other similarly appropriate IE. In procedure 214, network 112 accepts the routing area update request and provides UE 110 with the registered RAI which includes the PLMN ID of the registered PLMN and with a list of equivalent PLMNs. According to one or more embodiments, network 112 optionally may provide UE 110 with a default scope indicator. The default scope indicator indicates whether later on, if the PLMN rejects a request and the standard specifies that UE 110 shall not repeat it within this present PLMN, by default UE 110 shall not repeat the request until it registers with another PLMN which is not in the list of equivalent PLMNs, or until it registers with any other PLMN regardless whether it is equivalent to the network sending the reject message or not. For example, as discussed with respect to FIG. 1, above, PLMN2 of network 114 may be considered as an equivalent PLMN with PLMN1 of network 112.

Later, in process 216, UE 110 initiates an Activate PDP Context Request procedure, for example with PDP type Internet Protocol version 6 (IPv6) address. As for the requested APN, network 112 may support only IPv4 addresses, in which case network 112 responds in procedure 218 with an Activate PDP Context Reject message indicating SM cause #50 wherein only IPv4 address are allowed. UE 110 shall not repeat the request for this APN with PDP type IPv6 address until UE 110 registers with another PLMN which is not in the list of equivalent PLMNs.—According to one or more embodiments, network 112 additionally can indicate explicitly in the Scope indicator IE whether UE 110 shall not send another request for the same APN with the same PDP type IPv6 address until UE 110 registers with a PLMN which is not an equivalent PLMN, or until UE 110 registers with any other PLMN. If in procedure 214 network 112 provided a default scope indicator, network 112 signals the scope indicator in procedure 218 only if network 112 wishes to convey a value different from the default value signaled in procedure 214. It should be noted that in some cases network 112 can reject a request from UE 110 also in an "Accept" message. For example in procedure 220, UE 110 initiates an Activate PDP Context Request procedure with PDP type IPv4v6 address in which UE 110 asks for the allocation of both an IPv4 and an IPv6 address. As for the requested APN, if network 112 is supporting only IPv4 addresses, network 112 responds in procedure 222 with an Activate PDP Context Accept message indicating SM cause #50 indication that IPv4 address only allowed, that is network 112 accepts the request from UE 110 for an IPv4 address, and with the same message network 112 indicates to UE 110 that network 112 will not allocate an IPv6 address. Accordingly, UE 110 shall not repeat the request for this APN with PDP type IPv6 address until UE 110 registers with another PLMN which is not in the list of equivalent PLMNs. In one or more embodiments, network 112 additionally can indicate explicitly in the Scope indicator IE whether UE 110 shall not send another request for the same APN with PDP type IPv6 address until UE 110 registers with a PLMN which is not an equivalent PLMN, or until UE 110 registers with any other PLMN. If in procedure 214 network 112 provided a default scope indicator, network 112 signals the scope indicator in procedure 222 only if network 112 wishes to indicate a value different from the default value signaled in procedure 214.

In accordance with one or more embodiments, network 112 may send the Default scope indicator IE in procedure 214 or the scope indicator IE in procedure 218, or both, to all or most UEs. Such an arrangement may avoid or mitigate backwards compatibility issues since the new parameter for scope indicator or default scope indicator may be added to the relevant signaling messages as a new optional information element, or alternatively as a new field or fields within an existing information element, and legacy UEs may just ignore any unknown optional information element or unknown fields within an existing information element according to the protocol error handling procedures, although the scope of the claimed subject matter is not limited in this respect.

In according with one or more second embodiments, network 112 may send the default scope indicator or the scope indicator to UE 110 only if UE 110 previously indicated support of the Scope indicator IE in a Routing Area Update Request message in procedure 212 or an Attach Request message. Table 1, below shows as an example how the Activate PDP Context Accept message may be modified to include a Scope indicator IE, although the scope of the claimed subject matter is not limited in this respect.

TABLE 1

ACTIVATE PDP CONTEXT ACCEPT message content

| IEI | Information Element | Type/Reference | Presence | Format | Length |
|---|---|---|---|---|---|
| | Protocol discriminator | Protocol discriminator 10.2 | M | V | ½ |
| | Transaction identifier | Transaction identifier 10.3.2 | M | V | ½-3/2 |
| | Activate PDP context accept message identity | Message type 10.4 | M | V | 1 |
| | Negotiated LLC SAPI | LLC service access point identifier 10.5.6.9 | M | V | 1 |
| | Negotiated QoS | Quality of service 10.5.6.5 | M | LV | 13-21 |
| | Radio priority | Radio priority 10.5.7.2 | M | V | 1/2 |
| | Spare half octet | Spare half octet 10.5.1.8 | M | V | 1/2 |
| 2B | PDP address | Packet data protocol address 10.5.6.4 | O | TLV | 4-24 |
| 27 | Protocol configuration options | Protocol configuration options 10.5.6.3 | O | TLV | 3-253 |
| 34 | Packet Flow Identifier | Packet Flow Identifier 10.5.6.11 | O | TLV | 3 |
| 39 | SM cause | SM cause 2 10.5.6.6a | O | TLV | 3 |
| B- | Connectivity type | Connectivity type 10.5.6.19 | O | TV | 1 |
| C- | Scope indicator | Scope indicator 10.x.y.z | O | TV | 1 |

Figure 3:
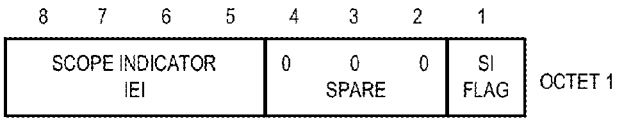
FIG. 3 is a diagram of a scope indicator information element in accordance with one or more embodiments.

Referring now to FIG. 3, a diagram of a scope indicator information element in accordance with one or more embodiments will be discussed. FIG. 3 and Table 2, below, show as an example how the Scope indicator IE could be defined. The Scope indicator parameter is defined as single flag indicating whether UE 110 may repeat the request upon registration with a new PLMN which is not in the list of equivalent PLMNs or upon registration with any new PLMN.

TABLE 2

Scope indicator information element
Scope indicator (SI) flag (octet 1)

| Bit 1 | |
|---|---|
| 0 | UE may repeat the request upon registration with any new PLMN |
| 1 | UE may repeat the request upon registration with a new PLMN which is not in the list of equivalent PLMNs |

Figure 4:
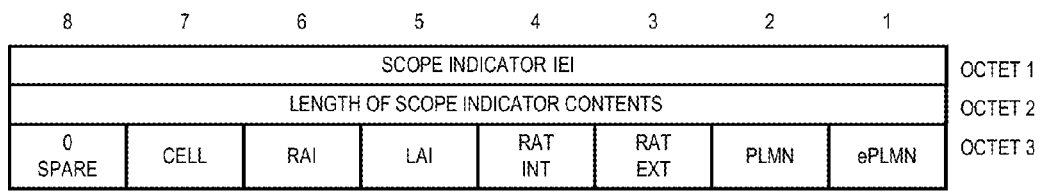
FIG. 4 is a diagram of an alternative scope indicator information element in accordance with one or more embodiments.

Referring now to FIG. 4, a diagram of an alternative scope indicator information element in accordance with one or more embodiments will be discussed. FIG. 4 and Table 3, below, show an alternative example how the Scope indicator IE could be defined. For this case the parameter is defined as set of flags indicating whether UE 110 may repeat the request upon entering a new area, where the concept of an area may be generalized so that network 112 can not only signal equivalent PLMN (ePLMN) and PLMNs as new area, but also inter-radio access technology (inter-RAT) change between A/Gb, Iu and S1 mode (RAT ext), any inter-RAT change (RAT int) including inter-RAT change between A/Gb and Iu mode, change to a new location area (LAI), change to a new routing area (RAI), or to a new cell. In accordance with one or more embodiments the network 112 may also set a combination of 2 or more flags. This may be treated by UE 110 so that it is entering a new area if any of the conditions indicated by one of the flags is fulfilled. For example, if the network is setting both the flag for PLMN and the flag for any inter-RAT change (RAT ext), the UE 110 is entering a new area when it enters a new RAT within the network 112 or when it enters a new PLMN, regardless whether the new PLMN is equivalent to network 112. In a second example, if the network 112 is setting both the flag for ePLMN and the flag for any inter-RAT change (RAT ext), the UE 110 is entering a new area when it enters a new RAT within the network 112 or when it enters a new PLMN which is not an equivalent PLMN. This means, in this second example when the UE 110 is entering an equivalent PLMN without changing the RAT, the UE 110 is not allowed to repeat the request.

TABLE 3

Scope indicator information element

Scope indicator flags (octet 1)
ePLMN (octet 3, bit 1)

0 UE is not allowed to repeat the request upon entering a new PLMN which is not in the list of equivalent PLMNs
1 UE is allowed to repeat the request upon entering a new PLMN which is not in the list of equivalent PLMNs TABLE 3-continued

| Scope indicator information element |
|---|
| PLMN (octet 3, bit 2) |

0  UE is not allowed to repeat the request upon entering any new PLMN
1  UE is allowed to repeat the request upon entering any new PLMN RAT ext (octet 3, bit 3)

0  UE is not allowed to repeat the request upon inter-RAT change from A/Gb mode or Iu mode to S1 mode
1  UE is allowed to repeat the request upon inter-RAT change from A/Gb mode or Iu mode to S1 mode RAT int (octet 3, bit 4)

0  UE is not allowed to repeat the request upon any inter-RAT change
1  UE is allowed to repeat the request upon any inter-RAT change LAI (octet 3, bit 5)

0  UE is not allowed to repeat the request upon entering a new location area (or tracking area)
1  UE is allowed to repeat the request upon entering a new location area (or tracking area)

RAI int (octet 3, bit 6)

0  UE is not allowed to repeat the request upon entering a new routing area
1  UE is allowed to repeat the request upon entering a new routing area cell (octet 3, bit 7)

0  UE is not allowed to repeat the request upon entering a new cell
1  UE is allowed to repeat the request upon entering a new cell
Bit 8 of octet 3 is spare and shall be coded as zero.

If none of the bits 1 to 7 is set, then UE 110 is allowed only to repeat the request when certain other events occur, for example switch-off/switch-on, removal of a Universal Subscriber Identity Module (SIM/USIM), expiry of a timer, and so on, which are specified explicitly for the respective case.

Figure 5:
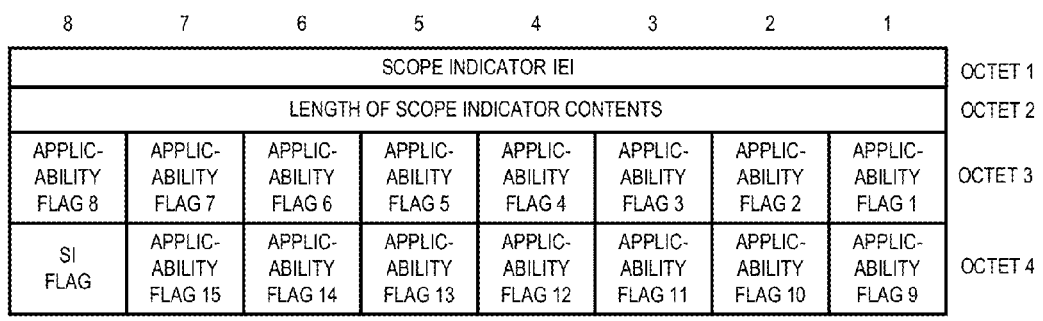
FIG. 5 is a diagram of a scope indicator matrix information element in accordance with one or more embodiments.

Referring now to FIG. 5, a diagram of a scope indicator matrix information element in accordance with one or more embodiments will be discussed. As another alternative embodiment, a matrix of applicable equivalent PLMNs may be utilized. This matrix will indicate for each of the individual equivalent PLMNs whether the rejection of the requested feature or service applies also for that specific PLMN and thus whether UE 110 is then allowed or not allowed to repeat the request upon entering that specific PLMN. Additionally, a flag in the matrix may indicate whether UE 110 is allowed to repeat the request upon entering a new PLMN not in its equivalent PLMN list or not. As discussed herein, such a matrix may be referred to as a Scope indicator matrix. It should be noted that typically specifications allow for 15 equivalent PLMNs to be indicated to UE, although the scope of the claimed subject matter is not limited in this respect. An example coding of the Scope indicator matrix IE is shown in FIG. 5 and Table 4, below.

TABLE 4

| Scope indicator matrix information element |
|---|
| Applicability flag 1 (octet 3, bit 1) |

Bit
1
0  UE is not allowed to repeat the request upon entering a new PLMN if MCC + MNC of the new PLMN
are matching the MCC + MNC of the 1st entry in the Equivalent PLMN list IE received from the network
1  UE is allowed to repeat the request upon entering a new PLMN if MCC + MNC of the new PLMN
matches the MCC + MNC of the 1st entry in the Equivalent PLMN list IE received from the network Applicability flag 2 (octet 3, bit 2)

Bit
2
0  UE is not allowed to repeat the request upon entering a new PLMN if MCC + MNC of the new PLMN
are matching the MCC + MNC of the 2nd entry in the Equivalent PLMN list IE received from the network
1  UE is allowed to repeat the request upon entering a new PLMN if MCC + MNC of the new PLMN
matches the MCC + MNC of the 2nd entry in the Equivalent PLMN list IE received from the network TABLE 4-continued Scope indicator matrix information element Applicability flag 3 (octet 3, bit 3)

Bit
3
0 UE is not allowed to repeat the request upon entering a new PLMN if MCC + MNC of the new PLMN
  are matching the MCC + MNC of the 3rd entry in the Equivalent PLMN list IE received from the network
1 UE is allowed to repeat the request upon entering a new PLMN if MCC + MNC of the new PLMN
  matches the MCC + MNC of the 3rd entry in the Equivalent PLMN list IE received from the network Applicability flag 4 (octet 3, bit 4)

Bit
4
0 UE is not allowed to repeat the request upon entering a new PLMN if MCC + MNC of the new PLMN
  are matching the MCC + MNC of the 4th entry in the Equivalent PLMN list IE received from the network
1 UE is allowed to repeat the request upon entering a new PLMN if MCC + MNC of the new PLMN
  matchces the MCC + MNC of the 4th entry in the Equivalent PLMN list IE received from the network Applicability flag 5 (octet 3, bit 5)

Bit
5
0 UE is not allowed to repeat the request upon entering a new PLMN if MCC + MNC of the new PLMN
  are matching the MCC + MNC of the 5th entry in the Equivalent PLMN list IE received from the network
1 UE is allowed to repeat the request upon entering a new PLMN if MCC + MNC of the new PLMN
  matches the MCC + MNC of the 5th entry in the Equivalent PLMN list IE received from the network Applicability flag 6 (octet 3, bit 6)

Bit
6
0 UE is not allowed to repeat the request upon entering a new PLMN if MCC + MNC of the new PLMN
  are matching the MCC + MNC of the 6th entry in the Equivalent PLMN list IE received from the network
1 UE is allowed to repeat the request upon entering a new PLMN if MCC + MNC of the new PLMN
  matches the MCC + MNC of the 6th entry in the Equivalent PLMN list IE received from the network Applicability flag 7 (octet 3, bit 7)

Bit
7
0 UE is not allowed to repeat the request upon entering a new PLMN if MCC + MNC of the new PLMN
  are matching the MCC + MNC of the 7th entry in the Equivalent PLMN list IE received from the network
1 UE is allowed to repeat the request upon entering a new PLMN if MCC + MNC of the new PLMN
  matches the MCC + MNC of the 7th entry in the Equivalent PLMN list IE received from the network Applicability flag 8 (octet 3, bit 8)

Bit
8
0 UE is not allowed to repeat the request upon entering a new PLMN if MCC + MNC of the new PLMN
  are matching the MCC + MNC of the 8th entry in the Equivalent PLMN list IE received from the network
1 UE is allowed to repeat the request upon entering a new PLMN if MCC + MNC of the new PLMN
  matches the MCC + MNC of the 8th entry in the Equivalent PLMN list IE received from the network TABLE 4-continued Scope indicator matrix information element Applicability flag 9 (octet 4, bit 1)

Bit 1
0 UE is not allowed to repeat the request upon entering a new PLMN if MCC + MNC of the new PLMN
  are matching the MCC + MNC of the 9th entry in the Equivalent PLMN list IE received from the network
1 UE is allowed to repeat the request upon entering a new PLMN if MCC + MNC of the new PLMN
  matchces the MCC + MNC of the 9th entry in the Equivalent PLMN list IE received from the network Applicability flag 10 (octet 4, bit 2)

Bit 2
0 UE is not allowed to repeat the request upon entering a new PLMN if MCC + MNC of the new PLMN
  are matching the MCC + MNC of the 10th entry in the Equivalent PLMN list IE received from the network
1 UE is allowed to repeat the request upon entering a new PLMN if MCC + MNC of the new PLMN
  matches the MCC + MNC of the 10th entry in the Equivalent PLMN list IE received from the network Applicability flag 11 (octet 4, bit 3)

Bit 3
0 UE is not allowed to repeat the request upon entering a new PLMN if MCC + MNC of the new PLMN
  are matching the MCC + MNC of the 11th entry in the Equivalent PLMN list IE received from the network
1 UE is allowed to repeat the request upon entering a new PLMN if MCC + MNC of the new PLMN
  matches the MCC + MNC of the 11th entry in the Equivalent PLMN list IE received from the network Applicability flag 12 (octet 4, bit 4)

Bit 4
0 UE is not allowed to repeat the request upon entering a new PLMN if MCC + MNC of the new PLMN
  are matching the MCC + MNC of the 12th entry in the Equivalent PLMN list IE received from the network
1 UE is allowed to repeat the request upon entering a new PLMN if MCC + MNC of the new PLMN
  matches the MCC + MNC of the 12th entry in the Equivalent PLMN list IE received from the network Applicability flag 13 (octet 4, bit 5)

Bit 5
0 UE is not allowed to repeat the request upon entering a new PLMN if MCC + MNC of the new PLMN
  are matching the MCC + MNC of the 13th entry in the Equivalent PLMN list IE received from the network
1 UE is allowed to repeat the request upon entering a new PLMN if MCC + MNC of the new PLMN
  matches the MCC + MNC of the 13th entry in the Equivalent PLMN list IE received from the network Applicability flag 14 (octet 4, bit 6)

Bit 6
0 UE is not allowed to repeat the request upon entering a new PLMN if MCC + MNC of the new PLMN
  are matching the MCC + MNC of the 14th entry in the Equivalent PLMN list IE received from the network
1 UE is allowed to repeat the request upon entering a new PLMN if MCC + MNC of the new PLMN
  matchces the MCC + MNC of the 14th entry in the Equivalent PLMN list IE received from the network TABLE 4-continued Scope indicator matrix information element Applicability flag 15 (octet 4, bit 7)

Bit
7
0 UE is not allowed to repeat the request upon entering a new PLMN if MCC + MNC of the new PLMN
  are matching the MCC + MNC of the 15th entry in the Equivalent PLMN list IE received from the network
1 UE is allowed to repeat the request upon entering a new PLMN if MCC + MNC of the new PLMN
  matches the MCC + MNC of the 15th entry in the Equivalent PLMN list IE received from the network Scope indicator (SI) flag (octet 4, bit 8)

Figure 6:
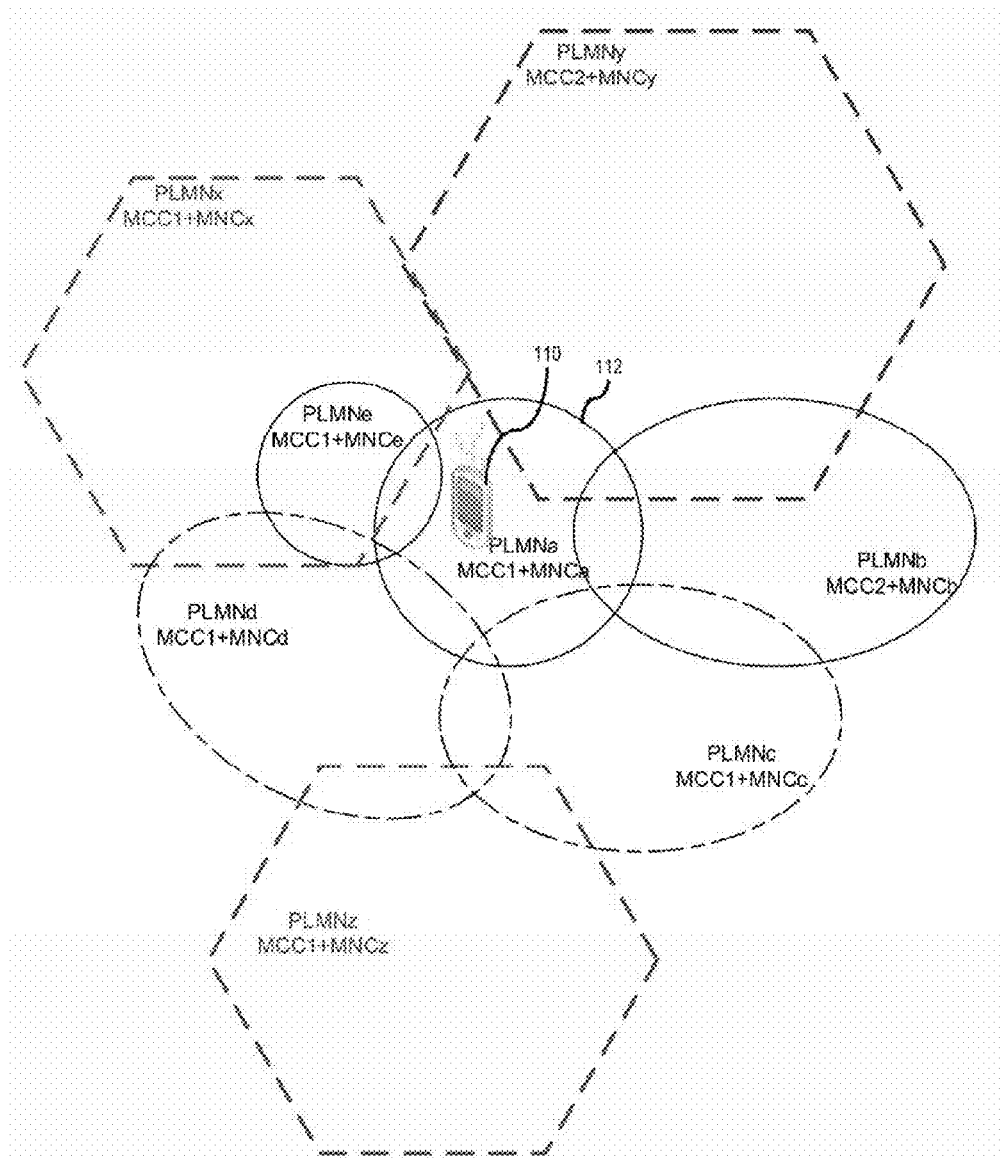
FIG. 6 is a diagram of a network system in which a scope indicator matrix as shown in FIG. 5 may be utilized in accordance with one or more embodiments.

Bit
8
0 UE may not repeat the request upon registration with a new PLMN which is not in the list of equivalent PLMNs
1 UE may repeat the request upon registration with a new PLMN which is not in the list of equivalent PLMNs Referring now to FIG. 6, a diagram of a network system in which a scope indicator matrix as shown in FIG. 5 may be utilized in accordance with one or more embodiments will be discussed. For this example consider that UE 110 is in its home PLMN, PLMNa (MCC1+MNCa). PLMNa has roaming and operational agreements with PLMNb (MCC2+MNCb), PLMNc (MCC1+MNCc), PLMNd (MCC1+MNCd), and PLMNe (MCC1+MNCe) shown in FIG. 6. PLMNx, PLMNy and PLMNz may comprise further PLMNs with which the operator of PLMNa does not have a roaming agreement. The operator of PLMNa wants its subscribers to consider PLMNb, PLMNc, PLMNd and PLMNe as equivalent PLMNs to PLMNa. Additionally, the operator of PLMNa may have commercial and deployment agreements with PLMNb and PLMNe to the extent that PLMNa, PLMNb and PLMNe may have a common deployment of certain services and features. An example message flow for such a scenario is shown in and described with respect to FIG. 7, below.

Figure 7:
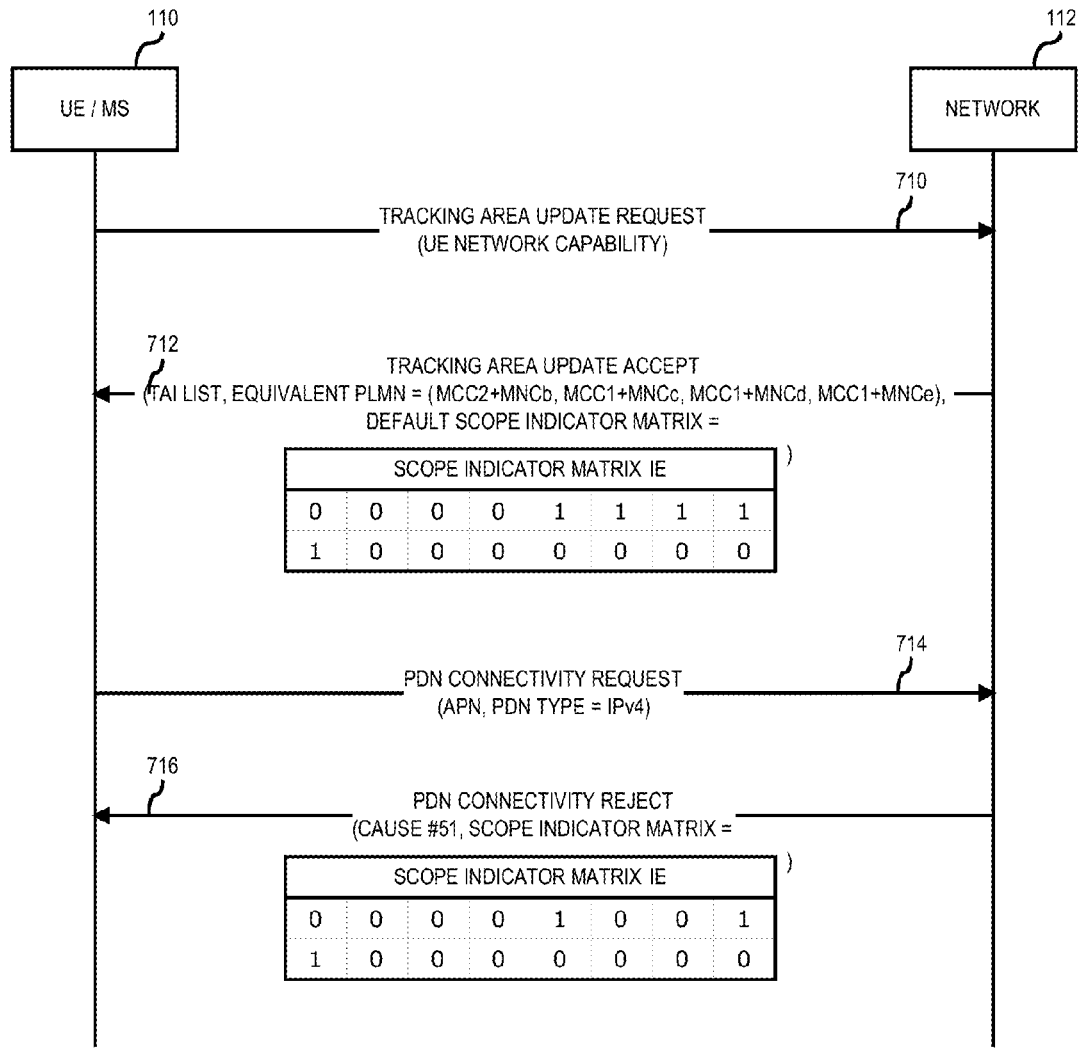
FIG. 7 is a diagram of a message flow in a network in which a scope indicator matrix as shown in FIG. 5 may be utilized in accordance with one or more embodiments.

Referring now to FIG. 7, a diagram of message flow in a network in which a scope indicator matrix as shown in FIG. 5 may be utilized in accordance with one or more embodiments will be discussed. As shown in FIG. 7, the home network of UE 110 may be network 112 corresponding to PLMNa. In process 710, UE 110 can indicate its ability to support and use the scope information in the TRACKING AREA UPDATE REQUEST. In process 712, network 112 accepts the registration of UE 110 and responds with TRACKING AREA UPDATE ACCEPT. In this message network 110 indicates the equivalent PLMNs for PLMNa are PLMNb, PLMNc, PLMNd, and PLMNe. Optionally, in process 712 network 112 can indicate a default scope indicator matrix using an example default scope indicator matrix as shown.

Later on in process 714, UE 110 requests for a service to an APN to which it has not established a PDN connection before. In this PDN CONNECTIVITY REQUEST UE 110 indicates the APN by name and also the requested PDN type, for example IPv4. In process 716, network 112 may determine, for example, that network 112 does not allow a request to that APN for IPv4 address, and as a result network 112 responds with a PDN CONNECTIVITY REJECT with reject cause #51. Along with this reject message, network 112 provides the Scope indicator matrix to UE 110 indicating explicitly that out of the equivalent PLMNs assigned to UE 110, UE 110 is allowed to repeat the request if it moves to equivalent PLMNb or equivalent PLMNe, but not if it moves to equivalent PLMNc or PLMNd. Additionally, UE 110 is allowed to repeat the request if UE 110 moves to any PLMN not included in the list of equivalent PLMNs. As the information about the scope of the reject provided in process 716 is specifically applicable to the PDN connectivity request, that scope indicator supersedes the default scope indications provided in process 712. By way of this example it can be seen how the Scope indicator matrix can be used by network 112 to provide information of finer granularity to UE 110 and how to signal to UE 110 in which of the indicated equivalent PLMNs UE 110 is allowed or not allowed to repeat a request for a service or feature. Similar to the example given in FIG. 4 and Table 3, the Scope indicator matrix also may be extended to include, for example, indications of whether UE 110 is allowed to repeat a request after there was an inter-RAT change within a specific equivalent PLMN or after there was any inter-RAT change. It should be noted that the described herein are merely example implementations of controlling a repeat request for UE 110 to network 112, and the scope of the claimed subject matter is not limited in these respects.

Figure 8:
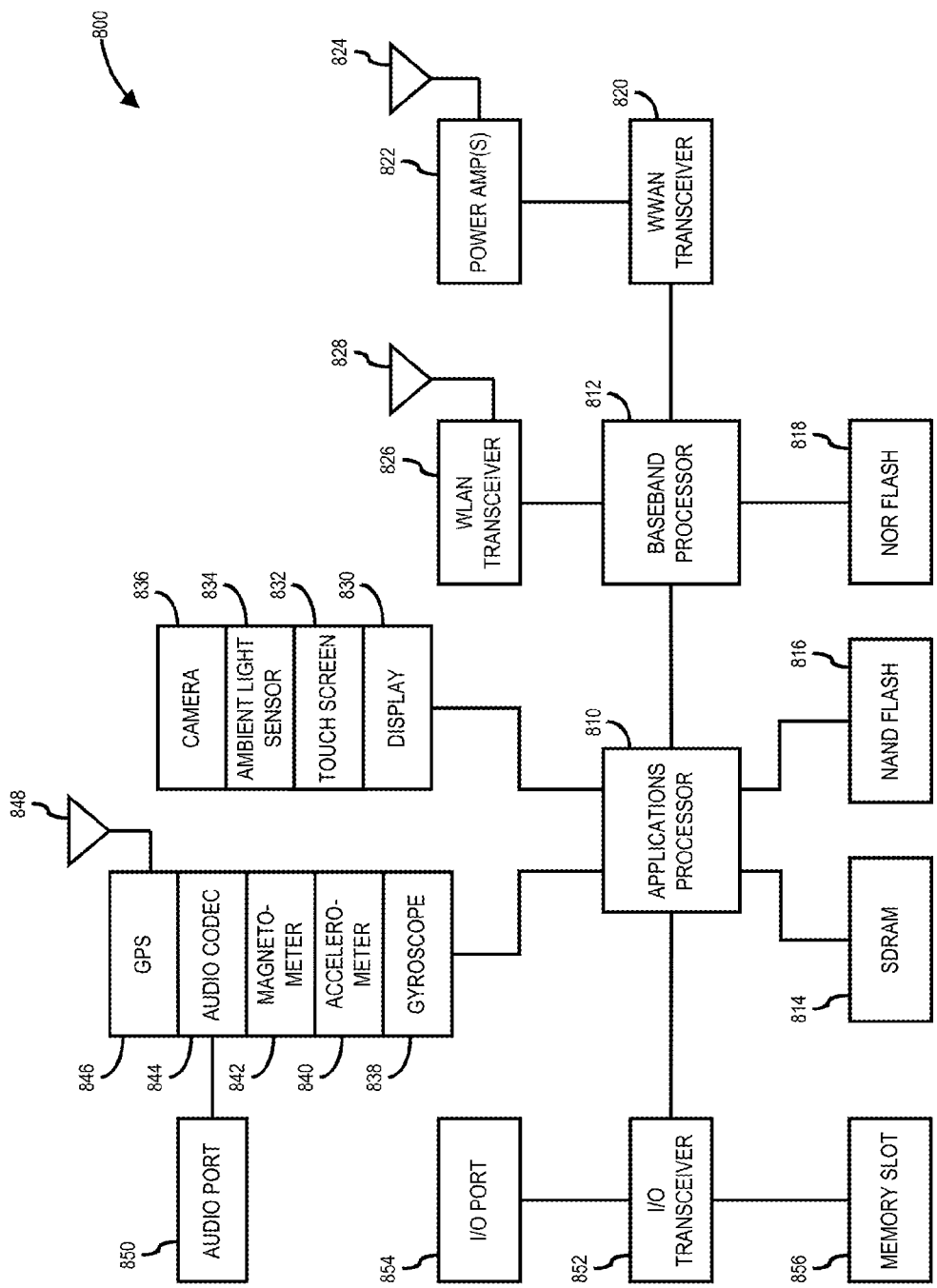
FIG. 8 is a block diagram of an information handling system capable of preventing repeating of a request in a network in accordance with one or more embodiments.

Referring now to FIG. 8, a block diagram of an information handling system capable of preventing a mobile device from repeating a request toward a mobile network in accordance with one or more embodiments will be discussed. Information handling system 800 of FIG. 8 may tangibly embody any one or more of the elements described herein, above, including but not limited to, for example, UE 110, network 112, network 114, GERAN/UTRAN 202, or SGSN 204, and so on, with greater or fewer components depending on the hardware specifications of the particular device. Although information handling system 800 represents one example of several types of computing platforms, information handling system 800 may include more or fewer elements and/or different arrangements of elements than shown in FIG. 8, and the scope of the claimed subject matter is not limited in these respects.

In one or more embodiments, information handling system 800 may include an application processor 810 and a baseband processor 812. Application processor 810 may be utilized as a general-purpose processor to run applications and the various subsystems for information handling system 800. Application processor 810 may include a single core or alternatively may include multiple processing cores wherein one or more of the cores may comprise a digital signal processor or digital signal processing (DSP) core. Furthermore, application processor 810 may include a graphics processor or coprocessor disposed on the same chip, or alternatively a graphics processor coupled to application processor 810 may comprise a separate, discrete graphics chip. Application processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 800 is powered off. In one or more embodiments, instructions to operate or configure the information handling system 800 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a 3GPP LTE or LTE-Advanced network or the like. In one or more embodiments, SDRAM 814, NAND Flash 816, and/or NOR Flash 818 may comprise an article of manufacture comprising a non-transitory storage medium having code stored thereon such as software, firmware, or logic circuits, to cause a machine, processor, computing device or computer to implement any method or system as discussed herein.

In general, WWAN transceiver 820 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 820 couples to one or more power amps 842 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth®, and/or an amplitude modulation (AM) or frequency modulation (FM) radio standard including an IEEE 802.11 a/b/g/n standard, and IEEE 802.11ac standard, or the like. It should be noted that these are merely example implementations for application processor 810 and baseband processor 812, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and so on, and the scope of the claimed subject matter is not limited in this respect.

In one or more embodiments, application processor 810 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by application processor 810 and/or at least temporarily stored in NAND flash 816. Furthermore, application processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, application processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects.

Figure 9:
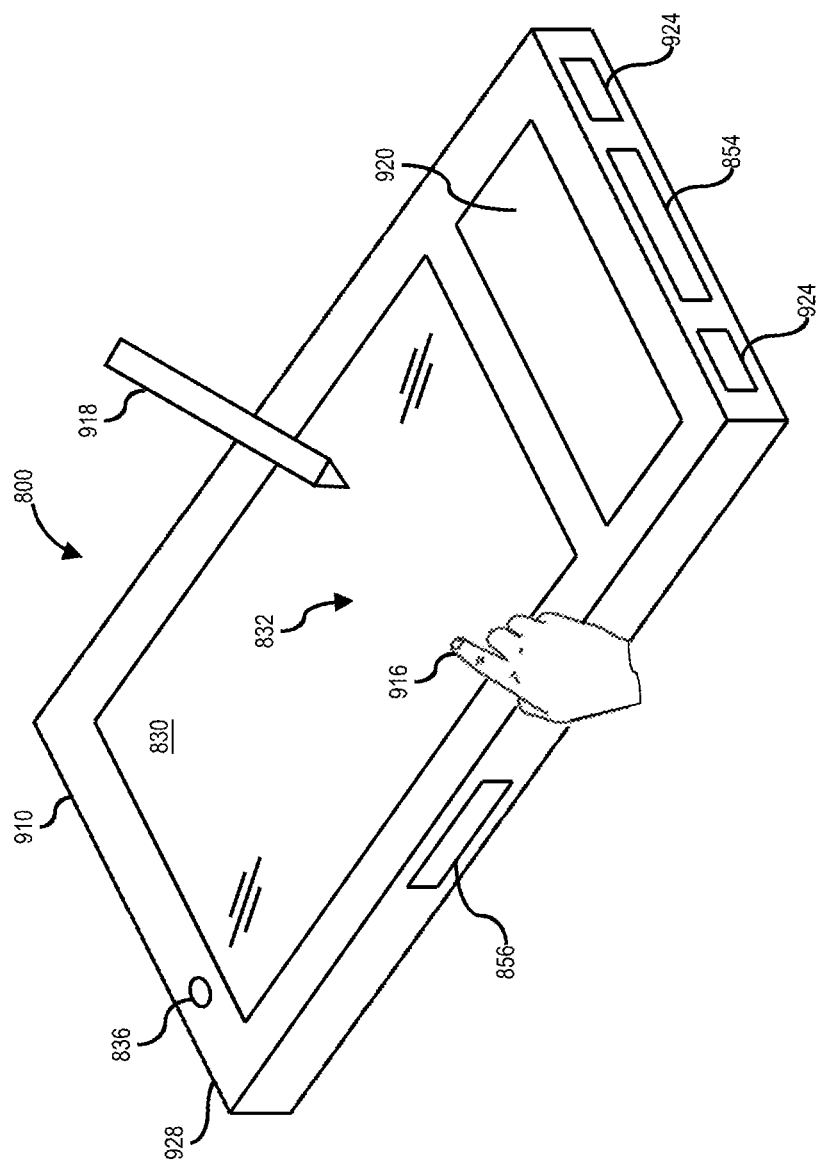
FIG. 9 is an isometric view of an information handling system of FIG. 8 that optionally may include a touch screen in accordance with one or more embodiments.

FIG. 9 is an isometric view of an information handling system of FIG. 8 that optionally may include a touch screen in accordance with one or more embodiments. FIG. 9 shows an example implementation of information handling system 800 of FIG. 8 tangibly embodied as a cellular telephone, smartphone, or tablet type device or the like, for example as an example embodiment of UE 110 or similar device. The information handling system 800 may comprise a housing 910 having a display 830 which may include a touch screen 832 for receiving tactile input control and commands via a finger 916 of a user and/or a via stylus 918 to control one or more application processors 810. The housing 910 may house one or more components of information handling system 800, for example one or more application processors 810, one or more of SDRAM 814, NAND flash 816, NOR flash 818, baseband processor 812, and/or WWAN transceiver 820. The information handling system 800 further may optionally include a physical actuator area 920 which may comprise a keyboard or buttons for controlling information handling system via one or more buttons or switches. The information handling system 800 may also include a memory port or slot 856 for receiving non-volatile memory such as flash memory, for example in the form of a secure digital (SD) card or a subscriber identity module (SIM) card. Optionally, the information handling system 800 may further include one or more speakers and/or microphones 924 and a connection port 854 for connecting the information handling system 800 to another electronic device, dock, display, battery charger, and so on. In addition, information handling system 800 may include a headphone or speaker jack 928 and one or more cameras 836 on one or more sides of the housing 910. It should be noted that the information handling system 800 of FIG. 9 may include more or fewer elements than shown, in various arrangements, and the scope of the claimed subject matter is not limited in this respect.

Various embodiments are discussed herein for purposes of example. It should be noted that the example embodiments and the variations thereof may comprise alternative combinations and are not required to exist in any specific embodiment, and the scope of the claimed subject matter is not limited in these respects. Example embodiments as discussed herein may include an apparatus to be included in a network node of a first public land mobile network (PLMN), the apparatus comprising: control circuitry to process a request from a user equipment (UE), to determine that the first PLMN is not to service the request, to generate an indication that the first PLMN is not to service the request based on the determination, and to generate an indication that the UE is not to repeat the request to the first PLMN, receive circuitry, coupled with the control circuitry, to receive an indication of the request from the UE; and transmit circuitry, coupled with the control circuitry, to facilitate transmission, to the UE, the indication that the first PLMN is not to service the request and the indication that the UE is not to repeat the request to the first PLMN. The control circuitry is to determine at least one other PLMN that is equivalent to the first PLMN and to generate an indication of whether the UE is allowed to repeat the request to the at least one other equivalent PLMN, and further wherein the transmit circuitry is to transmit an indication of the at least one other PLMN to the UE. Alternatively, the equivalent PLMN may determine whether or not to accept the request. The indication that the UE is not to repeat the request to the first PLMN is to additionally indicate that the UE is not to repeat the request to the at least one other equivalent PLMN. Alternatively, the indication that the UE is not to repeat the request to the first PLMN is to additionally indicate that the UE is to repeat the request to any other PLMN. The indication that the UE is not to repeat the request to the first PLMN is to be transmitted to the UE based on the determination that the first PLMN is not to service the request. The indication that the UE is not to repeat the request to the first PLMN is to be transmitted to the UE based on registration of the UE with the first PLMN. The control circuitry is to determine a duration after which the UE is able to repeat the request to the first PLMN and the transmit circuitry is to transmit the duration to the UE.

Additional example embodiments may include a method comprising processing, by a network node associated with a first public land mobile network (PLMN), a request from a user equipment (UE), determining that the first PLMN is not to service the request; transmitting an indication that the first PLMN is not to service the request based on the determining; and transmitting an indication that the UE is not to repeat the request to the first PLMN. The method further comprises determining at least one other PLMN that is equivalent to the first PLMN, generating an indication of whether the UE is allowed to repeat the request to the at least one other equivalent PLMN, and transmitting an indication of the at least one other PLMN to the UE. The indication that the UE is not to repeat the request to the first PLMN is to additionally indicate that the UE is not to repeat the request to the at least one other equivalent PLMN. Alternatively, the indication that the UE is not to repeat the request to the first PLMN is to additionally indicate that the UE is to repeat the request to any other PLMN. The transmitting of the indication that the UE is not to repeat the request to the first PLMN is based on the determination that the first PLMN is not to service the request. Wherein the transmitting of the indication that the UE is not to repeat the request to the first PLMN is based on registration of the UE with the first PLMN. The method further comprises determining a duration after which the UE is able to repeat the request to the first PLMN, and transmitting the duration to the UE.

Yet additional example embodiments include an apparatus to be included in a user equipment (UE), wherein the apparatus comprises control circuitry to register with a first public land mobile network (PLMN), to generate a request, to process an indication that the first PLMN is not to service the request, and to process an indication that the UE is not to repeat the request to the first PLMN; receive circuitry, coupled with the control circuitry, to receive the indications from the first PLMN; and transmit circuitry, coupled with the control circuitry, to transmit the request to the first PLMN. The control circuitry is to process an indication of at least one other PLMN that is equivalent to the first PLMN and to process an indication of whether the UE is allowed to repeat the request to the at least one other equivalent PLMN, and further wherein the receive circuitry is to receive the indication of the at least one other equivalent PLMN and the indication of whether the UE is allowed to repeat the request to the at least one other equivalent PLMN. The indication that the UE is not to repeat the request to the first PLMN is to additionally indicate that the UE is not to repeat the request to the at least one other equivalent PLMN. Alternatively, the indication that the UE is not to repeat the request to the first PLMN is to additionally indicate that the UE is to repeat the request to any other PLMN. The indication that the UE is not to repeat the request to the first PLMN is to be processed by the control circuitry based on the request. The indication that the UE is not to repeat the request to the first PLMN is to be processed by the control circuitry based on the registration of the UE with the first PLMN. The control circuitry is to determine a duration after which the UE is able to repeat the request to the first PLMN and optionally to cause the transmit circuitry to retransmit the request after the determined duration.

Additional example embodiments may include a method comprising registering, by a user equipment (UE), with a first public land mobile network (PLMN), transmitting a request to the first PLMN, receiving an indication that the first PLMN is not to service the request; and receiving an indication that the UE is not to repeat the request to the first PLMN. The method further comprises receiving an indication of at least one other PLMN that is equivalent to the first PLMN, and receiving an indication of whether the UE is allowed to repeat the request to the at least one other equivalent PLMN. The method further comprises receiving an indication that the UE is not to repeat the request to the at least one other equivalent PLMN. Alternatively, the indication that the UE is not to repeat the request to the first PLMN is to indicate that the UE is to repeat the request to any other PLMN. The receiving of the indication that the UE is not to repeat the request to the first PLMN is based on the request. The receiving the indication that the UE is not to repeat the request to the first PLMN is based on the registering of the UE with the first PLMN. The method further comprises receiving a duration after which the UE is able to repeat the request to the first PLMN, and optionally retransmitting the request after the determined duration.

Further example embodiments may include an apparatus comprising means to perform the method of any of examples discussed herein. Another example embodiment may include one or more non-transitory computer readable media comprising instructions configured to cause a network node, upon execution of the instructions by one or more processors of the network node, to perform any of the examples herein. A further example embodiment may include one or more non-transitory computer readable media comprising instructions configured to cause a user equipment (UE), upon execution of the instructions by one or more processors of the UE, to perform any of the examples herein.

Additional example embodiments may comprise a method comprising receiving, by a mobile network, an indication of a request from a user equipment (UE), and transmitting, by the mobile network, in response to the request, a message rejecting the request, and transmitting, by the mobile network, an indication that the UE is not allowed to repeat the request until the UE enters a different mobile network that does not belong to a set comprising at least two mobile networks. The set comprising the at least two mobile networks is indicated by the mobile network to the UE via signaling. The at least two mobile networks are networks according to the 3GPP standard, and the set comprising the at least two mobile networks is a list of equivalent PLMNs. The mobile network can transmit an indication that the UE is not allowed to repeat the request until the UE enters a cell belonging to at least one specified set of cells. The at least one specified set of cells can be indicated by the mobile network to include: any cell belonging to a mobile network different from the mobile network where the UE sent the request. The at least one specified set of cells can be indicated by the mobile network to include: any cell belonging to a specified subset of the set of the at least two mobile networks. The at least two mobile networks are networks according to the 3GPP standard, and the at least one specified set of cells can be indicated by the mobile network to include: any cell different from the cell where the UE sent the request, or any cell belonging to a routing area different from the routing area of the cell where the UE sent the request, or any cell belonging to a location area different from the location area of the cell where the UE sent the request, or any cell belonging to a tracking area different from the tracking area of the cell where the UE sent the request, or any cell belonging to a radio access technology (GERAN, UTRAN or E-UTRAN) different from the radio access technology of the cell where the UE sent the request, or any cell belonging to radio access technology GERAN or UTRAN, or any cell belonging to radio access technology E-UTRAN. The at least two mobile networks are networks according to the 3GPP standard, and the at least one specified set of cells can be indicated to be restricted to cells belonging to one of the at least two mobile networks. The UE may be allowed to repeat the request after the UE was switched off and on again, or after the subscriber identity module (SIM/USIM) was removed. The mobile network includes a backoff time in the message rejecting the request, and the UE is allowed to repeat the request when the backoff time has elapsed. The indication that the UE is not allowed to repeat the request until a certain criterion is fulfilled can be provided by the network when the UE is attaching to the mobile network or is updating its registration with the mobile network. The indication that the UE is not allowed to repeat the request until a certain criterion is fulfilled can be provided with the message rejecting the request. The UE can send different kinds of requests, and if in response to a certain request the mobile network provides both indications, then for this request the UE applies the indication received with the message rejecting the request and ignores the indication received while attaching to the network or while updating its registration with the network. The mobile network provides the indication that the UE is not allowed to repeat a request until a certain criterion is fulfilled only if the UE indicated support of the method of the respective claim when attaching to the mobile network or updating its registration with the mobile network.

In another example embodiment, a user equipment (UE) comprises control circuitry to register with a first public land mobile network ("LMN), to generate a request, to process an indication that the first PLMN is not to service the request, and to process an indication that the UE is not to repeat the request to the first PLMN, receive circuitry, coupled with the control circuitry, to receive the indications from the first PLMN, and transmit circuitry, coupled with the control circuitry, to transmit the request to the first PLMN. The control circuitry is to process an indication of at least one other PLMN that is equivalent to the first PLMN and to process an indication of whether the request is to be serviced by the at least one other equivalent PLMN, and further wherein the receive circuitry is to receive the indication of the at least one other equivalent PLMN and the indication of whether the UE is allowed to repeat the request to the at least one other equivalent PLMN. The indication that the UE is not to repeat the request to the first PLMN is to additionally indicate that the UE is not to repeat the request to the at least one other equivalent PLMN. The indication that the UE is not to repeat the request to the first PLMN is to indicate that the UE is allowed to repeat the request to any other PLMN. The indication that the UE is not to repeat the request to the at least one other equivalent PLMN is to be processed by the control circuitry based on the request. The indication that the UE is not to repeat the request to the at least one other equivalent PLMN is to be processed by the control circuitry based on the registration of the UE with the first PLMN. The control circuitry is to determine a duration after which the UE is able to repeat the request to the first PLMN and the cause the transmit circuitry is to retransmit the request after the determined duration.

In another example embodiment, a method comprises receiving, by a mobile network, an indication of a request from a user equipment (UE), and transmitting, by the mobile network, in response to the request, a message rejecting the request, and transmitting, by the mobile network, an indication that the UE is not allowed to repeat the request until the UE enters a different mobile network that does not belong to a set comprising at least two mobile networks. The set comprising the at least two mobile networks is indicated by the mobile network to the UE via signaling. The at least two mobile networks are networks according to the 3GPP standard, and the set comprising the at least two mobile networks is a list of equivalent PLMNs. Alternatively, the mobile network can transmit an indication that the UE is not allowed to repeat the request until the UE enters a cell belonging to at least one specified set of cells. The at least one specified set of cells can be indicated by the mobile network to include: any cell belonging to a mobile network different from the mobile network where the UE sent the request. The at least one specified set of cells can be indicated by the mobile network to include: any cell belonging to a specified subset of the set of the at least two mobile networks. The at least two mobile networks are networks according to a 3GPP standard, and the at least one specified set of cells can be indicated by the mobile network to include: any cell different from the cell where the UE sent the request, or any cell belonging to a routing area different from the routing area of the cell where the UE sent the request, or any cell belonging to a location area different from the location area of the cell where the UE sent the request, or any cell belonging to a tracking area different from the tracking area of the cell where the UE sent the request, or any cell belonging to a radio access technology (GERAN, UTRAN or E-UTRAN) different from the radio access technology of the cell where the UE sent the request, or any cell belonging to radio access technology GERAN or UTRAN, or any cell belonging to radio access technology E-UTRAN. The at least two mobile networks are networks according to a 3GPP standard, and the at least one specified set of cells can be indicated to be restricted to cells belonging to one of the at least two mobile networks.

In further example embodiments, a network node of a first Public Land Mobile Network (PLMN) comprises processing circuitry to receive a request from a user equipment (UE) for a service to be provided to the UE by the first PLMN, and send a response to the UE indicating whether the request is accepted or rejected, wherein the response indicates to the UE whether the UE is allowed to repeat the request if the UE connects to a second PLMN that is an equivalent PLMN with the first PLMN. The response includes a scope indicator to indicate to the UE that the response applies to all equivalent PLMNs for the requested service. The processing circuitry further is to send a default scope indicator to the UE to indicate to the UE whether a request is allowed to be made to an equivalent PLMN for any service desired by the UE from the equivalent PLMN. The response includes a scope indicator matrix to indicate to the UE a first set of equivalent PLMNs to which the response applies, and to indicate to the UE a second set of equivalent PLMNs to which the response does not apply. The processing circuitry is to send a default scope indicator matrix to the UE to indicate to the UE whether a request is allowed to be made to a first set equivalent PLMNs for any service desired by the UE from an equivalent PLMN, and whether the request is not allowed to be made to a second set of equivalent PLMNs for any service desired by the UE from an equivalent PLMN. The response is transmitted to the UE in a request accept message, or in a request reject message. An equivalent PLMN may be equivalent to the first PLMN for purposes of at least one of PLMN selection, cell selection, cell re-selection, or handover, or a combination thereof.

In further example embodiments, user equipment to connect to a first Public Land Mobile Network (PLMN) comprises processing circuitry to send a request to the first PLMN for a service to be provided to the UE by the first PLMN, and receive a response from the first PLMN indicating whether the request is accepted or rejected, wherein the response indicates to the UE whether the UE is allowed to repeat the request if the UE connects to a second PLMN that is an equivalent PLMN with the first PLMN. The response includes a scope indicator to indicate to the UE that the response applies to all equivalent PLMNs for the requested service. The processing circuitry is to receive a default scope indicator from the first PLMN to indicate to the UE whether a request is allowed to be made to an equivalent PLMN for any service desired by the UE from the equivalent PLMN. The response includes a scope indicator matrix to indicate to the UE a first set of equivalent PLMNs to which the response applies, and to indicate to the UE a second set of equivalent PLMNs to which the response does not apply. The processing circuitry further is to receive a default scope indicator matrix from the first PLMN to indicate to the UE whether a request is allowed to be made to a first set equivalent PLMNs for any service desired by the UE from an equivalent PLMN, and whether the request is not allowed to be made to a second set of equivalent PLMNs for any service desired by the UE from an equivalent PLMN. The response is received from the first PLMN in a request accept message, or in a request reject message. An equivalent PLMN may be equivalent to the first PLMN for purposes of at least one of PLMN selection, cell selection, cell re-selection, or handover, or a combination thereof.

In additional example embodiments, an article of manufacture comprises a non-transitory storage medium having instructions stored thereon that, if executed, result in receiving a request from a user equipment (UE) for a service to be provided to the UE by a first Public Land Mobile Network (PLMN), and sending a response to the UE indicating whether the request is accepted or rejected, wherein the response indicates to the UE whether the UE is allowed to repeat the request if the UE connects to a second PLMN that is an equivalent PLMN with the first PLMN. The response includes a scope indicator to indicate to the UE that the response applies to all equivalent PLMNs for the requested service. The instructions, if executed, further result in indicating to the UE whether a request is allowed to be made to an equivalent PLMN for any service desired by the UE from the equivalent PLMN. The response includes a scope indicator matrix to indicate to the UE a first set of equivalent PLMNs to which the response applies, and to indicate to the UE a second set of equivalent PLMNs to which the response does not apply. The instructions, if executed, further result in sending a default scope indicator matrix to the UE to indicate to the UE whether a request is allowed to be made to a first set equivalent PLMNs for any service desired by the UE from an equivalent PLMN, and whether the request is not allowed to be made to a second set of equivalent PLMNs for any service desired by the UE from an equivalent PLMN. The response is transmitted to the UE in a request accept message, or in a request reject message. An equivalent PLMN may be equivalent to the first PLMN for purposes of at least one of PLMN selection, cell selection, cell re-selection, or handover, or a combination thereof.

In yet further example embodiments, an article of manufacture comprises a non-transitory storage medium having instructions stored thereon that, if executed, result in sending a request to a first Public Land Mobile Network (PLMN) for a service to be provided to the UE by the first PLMN, and receiving a response from the first PLMN indicating whether the request is accepted or rejected, wherein the response indicates to the UE whether the UE is allowed to repeat the request if the UE connects to a second PLMN that is an equivalent PLMN with the first PLMN. The response includes a scope indicator to indicate to the UE that the response applies to all equivalent PLMNs for the requested service. The instructions, if executed, further result in receiving a default scope indicator from the first PLMN to indicate to the UE whether a request is allowed to be made to an equivalent PLMN for any service desired by the UE from the equivalent PLMN. The response includes a scope indicator matrix to indicate to the UE a first set of equivalent PLMNs to which the response applies, and to indicate to the UE a second set of equivalent PLMNs to which the response does not apply. The instructions, if executed, further result in receiving a default scope indicator matrix from the first PLMN to indicate to the UE whether a request is allowed to be made to a first set equivalent PLMNs for any service desired by the UE from an equivalent PLMN, and whether the request is not allowed to be made to a second set of equivalent PLMNs for any service desired by the UE from an equivalent PLMN. The response is received from the first PLMN in a request accept message, or in a request reject message. An equivalent PLMN may be equivalent to the first PLMN for purposes of at least one of PLMN selection, cell selection, cell re-selection, or handover, or a combination thereof.

Although the claimed subject matter has been described with a certain degree of particularity, it should be recognized that elements thereof may be altered by persons skilled in the art without departing from the spirit and/or scope of claimed subject matter. It is believed that the subject matter pertaining to preventing a mobile device from repeating a request toward a mobile network and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising: baseband processing circuitry to:
   decode a first information element (IE), Equivalent PLMNs, received from a present public land mobile network (PLMN) that includes a list of equivalent PLMNs that are equivalent to the present PLMN;
   generate a request to the present PLMN for a session management procedure;
   process a rejection message received from the present PLMN regarding the requested session management procedure; and
   decode a second IE, Re-attempt indicator, received from the present PLMN indicating whether the UE is allowed to re-attempt the request for the session management procedure with an equivalent PLMN in the list of equivalent PLMNs, wherein the second IE indicates that the UE is allowed to re-attempt the request in an equivalent PLMN; and
   a memory to store the list of equivalent PLMNs.

2. The apparatus of claim 1, wherein the session management procedure request comprises a Packet Data Protocol (PDP) context request message, ACTIVATE PDP CONTEXT REQUEST.

3. The apparatus of claim 1, wherein the rejection message comprises a Packet Data Protocol (PDP) context reject message, ACTIVATE PDP CONTEXT REJECT.

4. The apparatus of claim 3, wherein the PDP context reject message indicates PDP type IPv4 only is allowed, PDP type IPv6 only is allowed, or a requested access point name (APN) is not supported in a current radio access technology (RAT) and PLMN combination.

5. The apparatus of claim 1, wherein the UE further is not to re-attempt the request for the session management procedure for an equivalent PLMN until a timer expires.

6. The apparatus of claim 1, wherein an equivalent PLMN in the list of equivalent PLMNs is equivalent to the present PLMN for at least one of PLMN selection, cell selection, cell re-selection, or handover, or a combination thereof.

7. The apparatus of claim 1, further comprising a radio-frequency (RF) transceiver to receive the first IE or the second IE from the first PLMN, or to transmit the request for the session management procedure to the first PLMN, or a combination thereof.

8. An apparatus of an evolved Node B (eNB), comprising: baseband processing circuitry to:
   encode a first information element (IE), Equivalent PLMNs, to be sent to a user equipment (UE) that includes a list of equivalent public land mobile networks (PLMNs) that are equivalent to a present PLMN of the eNB;
   process a request from the UE for a session management procedure;
   generate a rejection message for the UE regarding the requested session management procedure; and
   encode a second IE, Re-attempt indicator, to be sent to the UE indicating whether the UE is allowed to re-attempt the request for the session management procedure with an equivalent PLMN in the list of equivalent PLMNs, wherein the second IE indicates that the UE is allowed to re-attempt the request in an equivalent PLMN; and
   a memory to store the list of equivalent PLMNs.

9. The apparatus of claim 8, wherein the session management procedure request comprises a Packet Data Protocol (PDP) context request message, ACTIVATE PDP CONTEXT REQUEST.

10. The apparatus of claim 8, wherein the rejection message comprises a Packet Data Protocol (PDP) context reject message, ACTIVATE PDP CONTEXT REJECT.

11. The apparatus of claim 10, wherein the PDP context reject message indicates PDP type IPv4 only is allowed, PDP type IPv6 only is allowed, or a requested access point name (APN) is not supported in a current radio access technology (RAT) and PLMN combination.

12. The apparatus of claim 8, wherein the rejection message indicates that the UE further is not to re-attempt the request for the session management procedure for an equivalent PLMN until a timer expires.

13. The apparatus of claim 8, wherein an equivalent PLMN in the list of equivalent PLMNs is equivalent to the present PLMN for at least one of PLMN selection, cell selection, cell re-selection, or handover, or a combination thereof.

14. The apparatus of claim 8, further comprising a radio-frequency (RF) transceiver to transmit the first IE or the second IE from the UE, or to receive the request for the session management procedure to the UE, or a combination thereof.

15. One or more non-transitory machine-readable media having instructions stored thereon that, if executed by a user equipment (UE), result in:
    decoding a first information element (IE), Equivalent PLMNs, received from a present public land mobile network (PLMN) that includes a list of equivalent PLMNs that are equivalent to the present PLMN;
    generating a request to the present PLMN for a session management procedure;
    processing a rejection message received from the present PLMN regarding the requested session management procedure; and
    decoding a second IE, Re-attempt indicator, received from the present PLMN indicating whether the UE is allowed to re-attempt the request for the session management procedure with an equivalent PLMN in the list of equivalent PLMN, wherein the second IE indicates that the UE is not allowed to re-attempt the request in an equivalent PLMN.

16. The one or more non-transitory machine-readable media of claim 15, wherein the session management procedure request comprises a Packet Data Protocol (PDP) context request message, ACTIVATE PDP CONTEXT REQUEST.

17. The one or more non-transitory machine-readable media of claim 15, wherein the rejection message comprises a Packet Data Protocol (PDP) context reject message, ACTIVATE PDP CONTEXT REJECT.

18. The one or more non-transitory machine-readable media of claim 17, wherein the PDP context reject message indicates PDP type IPv4 only is allowed, PDP type IPv6 only is allowed, or a requested access point name (APN) is not supported in a current radio access technology (RAT) and PLMN combination.

19. The one or more non-transitory machine-readable media of claim 17, wherein the rejection message indicates that the UE is not to re-attempt the request for the session management procedure for an equivalent PLMN until a timer expires.

20. The one or more non-transitory machine-readable media of claim 15, wherein an equivalent PLMN in the list of equivalent PLMNs is equivalent to the present PLMN for at least one of PLMN selection, cell selection, cell re-selection, or handover, or a combination thereof.

21. The one or more non-transitory machine-readable media of claim 15, wherein the instructions, if executed, further result in receiving the first IE or the second IE from the first PLMN, or sending the request for the session management procedure to the first PLMN, or a combination thereof.

22. One or more non-transitory machine-readable media having instructions stored thereon that, if executed by an evolved Node B (eNB), result in:
    encoding a first information element (IE), Equivalent PLMNs, to be sent to a user equipment (UE) that includes a list of equivalent public land mobile networks (PLMNs) that are equivalent to a present PLMN of the eNB;
    processing a request from the UE for a session management procedure;
    generating a rejection message for the UE regarding the requested session management procedure; and
    encoding a second IE, Re-attempt indicator, to be sent to the UE indicating whether the UE is allowed to re-attempt the request for the session management procedure with an equivalent PLMN in the list of equivalent PLMNs, wherein the second IE indicates that the UE is not allowed to re-attempt the request in an equivalent PLMN.

23. The one or more non-transitory machine-readable media of claim 22, wherein the session management procedure request comprises a Packet Data Protocol (PDP) context request message, ACTIVATE PDP CONTEXT REQUEST.

24. The one or more non-transitory machine-readable media of claim 22, wherein the rejection message comprises a Packet Data Protocol (PDP) context reject message, ACTIVATE PDP CONTEXT REJECT.

25. The one or more non-transitory machine-readable media of claim 24, wherein the PDP context reject message indicates PDP type IPv4 only is allowed, PDP type IPv6 only is allowed, or a requested access point name (APN) is not supported in a current radio access technology (RAT) and PLMN combination.

26. The one or more non-transitory machine-readable media of claim 24, wherein the rejection message indicates that the UE is not to re-attempt the request for the session management procedure for an equivalent PLMN until a timer expires.

27. The one or more non-transitory machine-readable media of claim 22, wherein an equivalent PLMN in the list of equivalent PLMNs is equivalent to the present PLMN for at least one of PLMN selection, cell selection, cell re-selection, or handover, or a combination thereof.

28. The one or more non-transitory machine-readable media of claim 22, wherein the instructions, if executed, further result in transmitting the first IE or the second IE from the UE, or for receiving the request for the session management procedure to the UE, or a combination thereof.

* * * * *